US006377240B1

(12) United States Patent
Baudel et al.

(10) Patent No.: US 6,377,240 B1
(45) Date of Patent: Apr. 23, 2002

(54) DRAWING SYSTEM USING DESIGN GUIDES

(75) Inventors: Thomas P. H. Baudel; George W. Fitzmaurice; William A. S. Buxton; Gordon P. Kurtenbach; Charles T. Tappen, all of Toronto; Peter E. Liepe, Don Mills, all of (CA)

(73) Assignee: Silicon Graphics, Inc., Mountain View, CA (US)

( * ) Notice: Subject to any disclaimer, the term of this patent is extended or adjusted under 35 U.S.C. 154(b) by 0 days.

(21) Appl. No.: 09/267,672

(22) Filed: Mar. 15, 1999

Related U.S. Application Data

(63) Continuation of application No. 08/691,362, filed on Aug. 2, 1996, now abandoned.

(51) Int. Cl.[7] .............................................. G06T 15/00
(52) U.S. Cl. ...................................................... 345/157
(58) Field of Search ................................ 345/433, 419, 345/157, 158, 167, 156

(56) References Cited

U.S. PATENT DOCUMENTS 5,341,466 A  * 8/1994 Perlin et al. ................. 395/139
5,581,670 A    12/1996 Bier et al. .................... 395/326

FOREIGN PATENT DOCUMENTS

EP          0635781       1/1996

OTHER PUBLICATIONS

Myron W. Krueger, "Artificial Reality II", *Computer Science/Science/Art*, 1990.
Eric Allen Bier and Maureen C. Stone, "Snap–Dragging", *SIGGRAPH '86*, Dallas, vol. 20, No. 4, 1986, pp. 233–240.
Jean–Daniel Fekete, "A Multi–Layer Graphic Model for Building Interactive Graphical Applications", *Graphics Interface '92*, pp. 294–300.
William Buxton and Brad A. Myers, "A Study in Two –Handed Input", *CHI'86 Proceedings*, Apr. 1986, pp. 321–326.

* cited by examiner

Primary Examiner—Phu K. Nguyen
(74) Attorney, Agent, or Firm—Staas & Halsey LLP

(57) ABSTRACT

An electronic design guide, such as a french curve, can be placed in the geometry layer of a drawing program. This allows the design guide and a drawing tool, such as an electronic paint brush, to be moved about with in the drawing simultaneously using two different input control devices, such as a mouse and an electronic stylus/tablet. The design guide can then be used block or mask paint from being applied to the drawing by comparing the coordinates of the cursor with the area of the guide and setting pixels of the drawing accordingly. The masking can be performed even as the guide is moved. The system also can be set to constrain the path of the ink applied by the drawing tool to the edge of the drawing guide even as the guide is moved. As the cursor is moved the position of the cursor is matched with the closest next line segment of the guide and that portion painted.

27 Claims, 10 Drawing Sheets

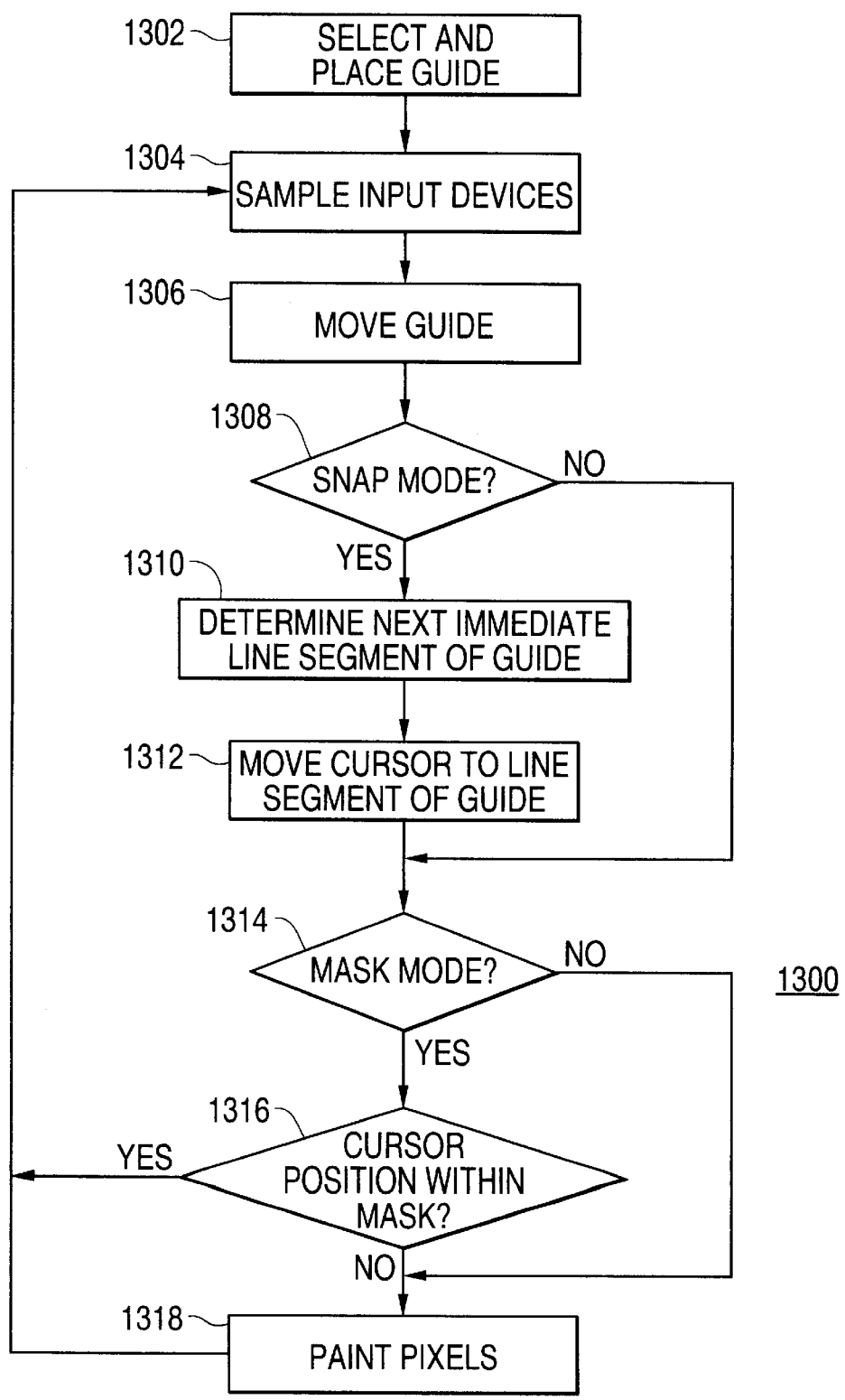

DRAWING SYSTEM USING DESIGN GUIDES

This application is a continuation of application Ser. No. 08/691,362, filed Aug. 2, 1996, now ABN.

BACKGROUND OF THE INVENTION

1. Field of the Invention

The present invention is directed to a system that allows a designer of graphics to use an electronic design guide to constrain or limit the path of an electronic tool, such as an electronic paint brush, as well as limit the application of paint and, more particularly, to a system that provides a design guide that is independently movable from the tool being used and which can be used at the same time as the tool to constrain the ink or paint produced for the tool to a path along an edge of the guide and can be used to block or mask out portions of the drawing from receiving ink.

2. Description of the Related Art

In conventional paint or graphical compositing programs the user has a variety drawing tools, such as paint brushes, pens, etc., that allow the user to easily create drawings, paintings, eventually incorporating special graphic effects. When used for such special effects the painting software allows the user to create drawings with such graphics much faster with more flexibility, allows reuse of previous drawings and allows editing changes more easily and cleanly than with conventional non-electronic drawing tools, such as a pencil and paper.

The conventional programs also have a variety of shapes or objects that can be selected and placed within the geometrical layer of a drawing. These objects, such as circles, triangles, rectangles, etc. can be sized and oriented as desired by the user using an input control device such as a mouse. After positioning, etc. the user can make the object part of the canvas of the drawing by "applying" it, thus providing the drawing with lines of a desired shape. In using such objects the user first selects and positions the object using a conventional menu and input control device, such as the mouse, and then either designates all or part of the object to become part of the drawing. That is, the same input device is used to select and place the object as well as to place ink on the drawing associated with the tool. The user is also limited to the lines made by the object and if the lines of the drawing need to be a different shape the user must select, place and size another object.

In contrast to electronic drawing, when a graphical designer is drawing using non-electronic drawing tools like a pencil and a design guide, such as a french curve, the user can move both the design guide and the drawing tool at the same time. This allows the user to use the guide as an edge for constraining the drawing tool and as a mask to block the ink from certain areas, and also allows the user to constantly adjust the position of the guide to change the shape of the graphic as the drawing progresses.

The use of non-electronic design guides and drawing tools allows the user to produce certain types of drawings much faster that can be produced with electronic tools and allows the user enhanced control over the drawing process in such situations.

What is needed is a system that brings the two handed or simultaneous control of the design guide and drawing tool to the user as well as the ability to constrain or limit the ink with the guide.

SUMMARY OF THE INVENTION

It is an object of the present invention to give the user of electronic drawing systems increased flexibility in drawing lines and painting areas.

It is another object of the present invention to give the user of an electronic drawing program the commonly used non-electronic drawing tools, such as a french curve or a sweep or a mask commonly called a frisket.

It is an object of the present invention to provide the user of an electronic drawing program the capability of using and moving an electronic design guide, such as a french curve, at the same time that the user is using an electronic drawing tool, such as a paint brush.

It is also an object of the present invention to provide an electronic drawing guide that constrains the path of a drawing tool to the drawing guide.

It is a further object of the present invention to provide an electronic drawing guide that can be used as a mask to block the painting of a drawing with a drawing tool.

It is another object of the present invention to provide a design guide that can be used as both a line constraining tool and as a paint blocking tool at the same time.

It is still another object of the present invention to provide the user with a more natural interaction with the drawing program by providing the sweeps, french curves and other design guides that are commonly used tools in a design environment, which may be less precise, but which artists in general tend to understand better than the usual computer splines (with CVs), making it easier to realize nice looking curves.

It is an object of the present invention to provide the user with more functionality by providing a snap painting action that allows the user to easily trace a smooth curve, while adding some character to it by controlling easily (over stroking) the exact "touch" one wants to give to the drawing tool.

It is a further object of the present invention to provide a frisket or masking tool that allows control of the mask more easily by getting rid of it or adjusting it in an instant, instead of having to switch tools back and forth.

It is also an object to combine masking and snap painting to allow the user to provide nice looking shape edges on one side of a precise contour, with an effect, such as a feathered look provided by the particular drawing tool, on the other side, allowing "aura effects" which are unique to the combination of both techniques and not achievable with physical equivalent accessories.

The above objects can be attained by a system that allows the user to use the geometry layer of a drawing program as a design guide, such as a french curve. The system allows the design guide and a drawing tool, such as a paint brush, represented by a cursor in the display to be moved about within the drawing simultaneously using two different input control devices, such as a mouse and an electronic stylus/tablet. The design guide can then be used to block paint, or to mask paint from being applied to the drawing. The system also can be set to constrain the path of the ink applied by the drawing tool to the edge of the drawing guide even as the guide is moved. Both the constraining of the ink and the masking can also be performed simultaneously.

These together with other objects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 13 illustrates the process of the present invention.

DESCRIPTION OF THE PREFERRED EMBODIMENTS

Figure 1:
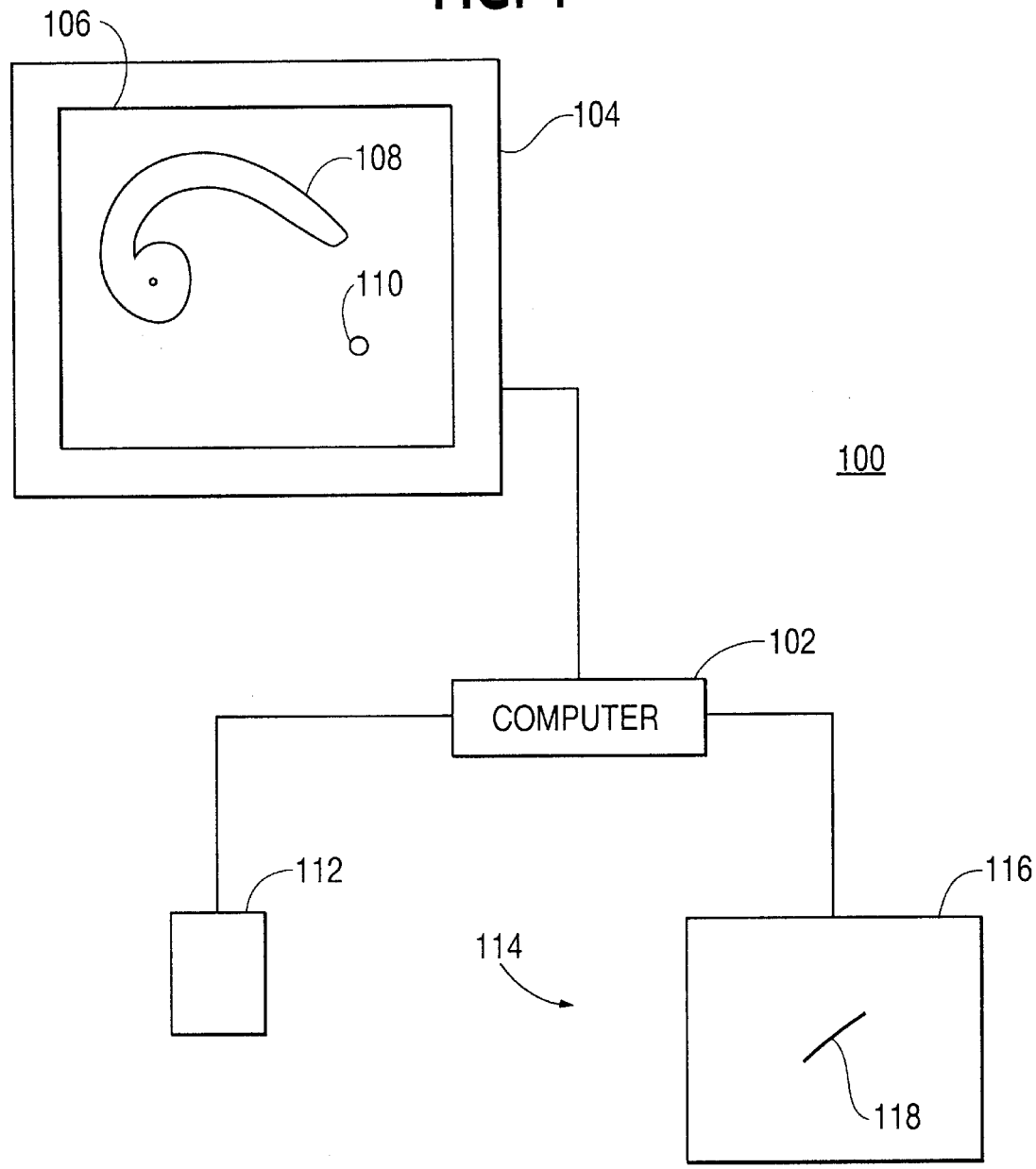
FIG. 1 depicts hardware components of a system in accordance with the present invention.

Drawing guides, such as non-electronic sweeps and friskets (masks), are accessories that help a designer achieve some graphic effects by constraining or changing the effect of the tool he or she is using. The present invention implements the behavior of these accessories in a paint/graphical compositing program to allow for a more natural interaction and more expressive power. Furthermore, the computer allows some effects that are not possible with their real world non-electronic counterparts. The functionalities provided by the present invention can be summarized as: 1) Snap-painting in which a user definable ruler/sweep guides the user's brush (cursor) or any other current tool on specific predefined contours. 2) Frisket masking in which a mask that can be moved around (with the non dominant hand or not) while painting (with the other hand). This mask can be customized just as the sweep with any user-defined geometric. Like in the real world, the accessory can be handled with the non-dominant hand, while the tool is manipulated with the dominant hand. 3) The combination of both snap-painting and frisket masking used at the same time (with the same geometry) to allow special graphical effects unachievable with current real or computer-based tools. 4) Fast editing of the accessory through contextual menus and handles (manipulators) on the movable shape. These allow editing of the shape as well as translating, scaling and rotating the shape in a graceful way. 5) Use of transparency to reduce intrusiveness. The sweep/frisket is shown as a semi-transparent surface, to let the user see what's underneath the accessory. 6) Use of overlay planes to allow fast movement of the guides when painting while simultaneously moving the guide line with the non-dominant hand. On today's highend workstations, such as Silicon Graphics, Inc. workstations, the display provides the ability to superimpose an image (called the "overlay plane") on top of the normal image plane. As a result, the image that the user sees on the screen results from a very fast composition of the normal and the overlay planes, whereas to the program, the two planes are handled as two separate images that can be managed (refreshed) independently from each other. This allows implementation of fast moving graphics on top of the drawing. In the present invention the design guide is displayed in the overlay plane, while the composition is in the normal plane, allowing the design guide to appear on top of the drawing and move smoothly without causing flickering of the underneath image.

In general, in the present invention, the "geometry layer" of the canvas (application data) is enhanced with the following properties: A. When painting, a user settable option can make the brush or current tool "snap" to the geometry shapes of this geometry layer, B. The geometry can be applied to the mask layer of the paint program, the mask and geometry layers can be synchronized to be moved, rotated and scaled simultaneously. C. The geometry layer can be dragged around and positioned with the non-dominant hand, two handed editing is also possible. D. The geometry layer is drawn in the overlay planes to allow non intrusiveness and fast updates. E. The usual "handles" used to edit geometry are complemented by a "contextual menu" hot spot that allows applying functions to the object. These handles are made to detect whether the user is using one or two hands to edit the shape and adapt in consequence.

The system 100 of the present invention, as illustrated in FIG. 1, includes a computer 102, such as a conventional work station computer available from Silicon Graphics, Inc,. and used with drawing programs. The computer 102 includes the appropriate storage devices ouch as RAM, ROM, hard disk, floppy disk, etc. on which the process of the present invention can be stored. The computer 102 executes a conventional drawing program, such as StudioPaint™ of Alias/Wavefront of Toronto, Canada, that allows the user to select and place geometrical objects on/in a drawing on a display of a display unit 104 as well as draw or paint with conventional electronic drawing tools, such as an electronic paint brush. Sometimes the "painting" is called rasterization of the stroke and the paint layer is called the raster copy. The display 106 of the unit 104 depicts a sweep type electronic design guide 108 and a cursor 110 of an electronic paint brush. The display unit 104 is preferably of the bit-mapped or raster type and is also available from Silicon Graphics, Inc. The present invention also includes preferably two continuous input devices, such as a conventional mouse 112 and a conventional electronic tablet system 114 that includes a tablet 116 and a stylus 118. The two input devices allow the design guide 108 and the cursor 110 to be moved simultaneously. The present invention can use only one pointing device and switch, by means of a button or menu, to moving the design guide or moving the paint brush which is, of course, less convenient for the user. Of course other types of input devices can be used, such an a single tablet capable of simultaneously sensing two devices, such as a device sold by Wacom Technologies, of Japan as models UD1212 and UD1218 or a trackball and another device allowing the positioning of a cursor on the screen.

Figure 2:
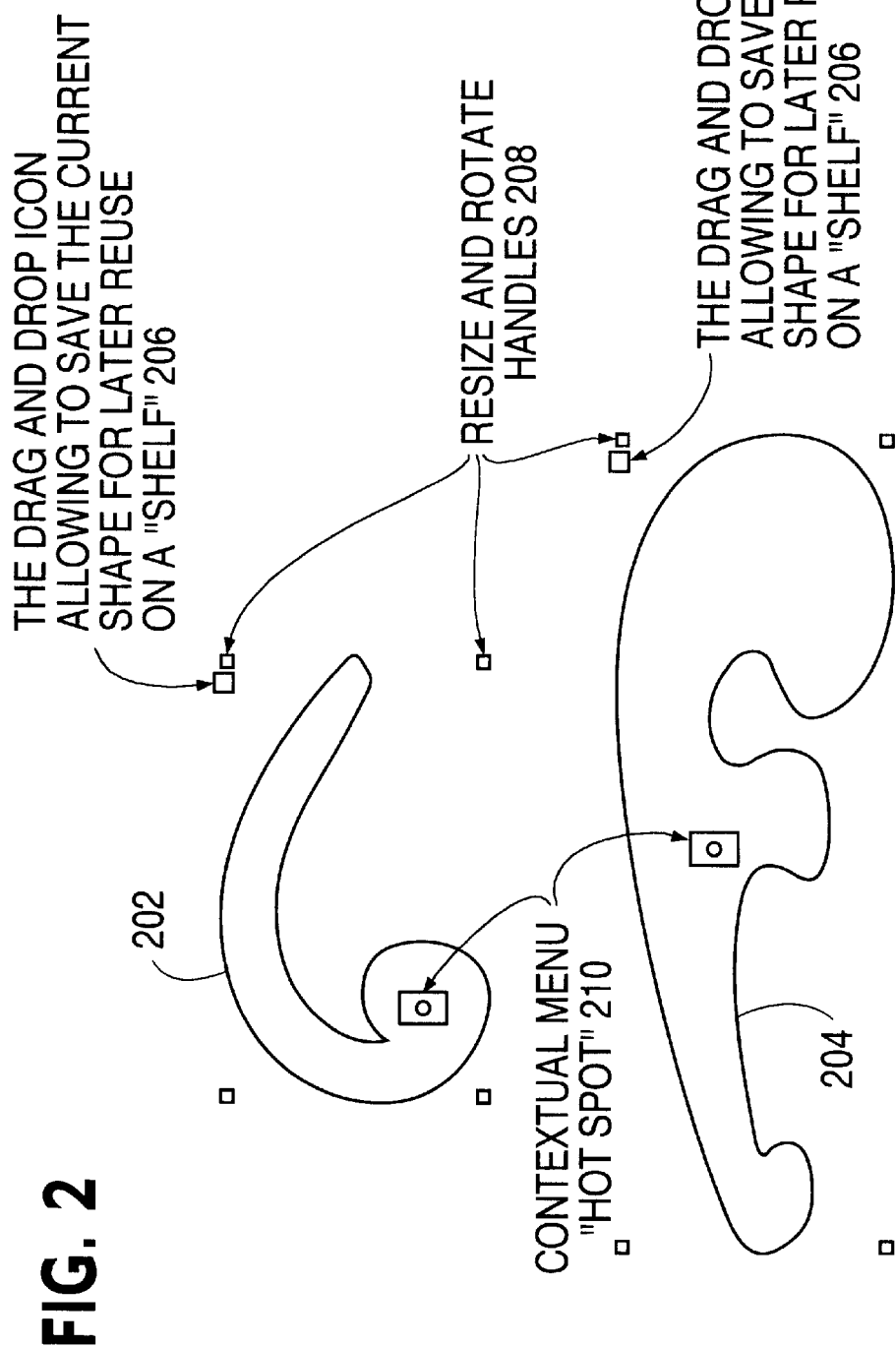
FIG. 2 depicts control points for design guides.
Figure 3:
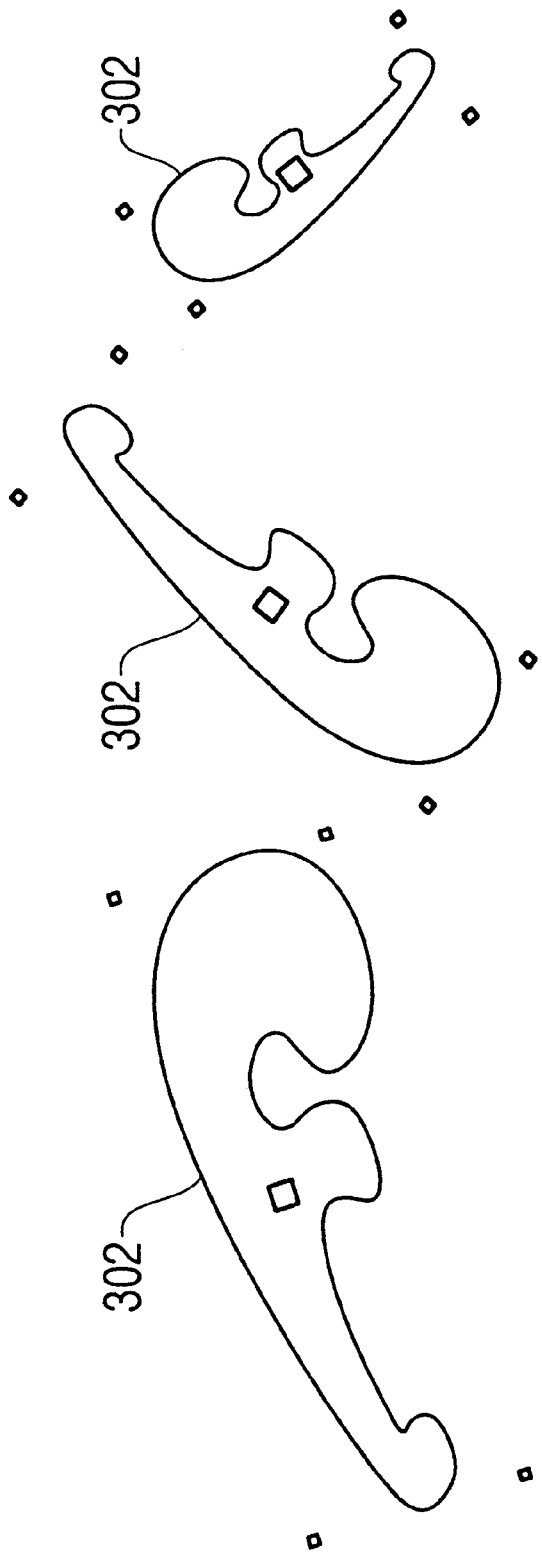
FIG. 3 depicts rotating and resizing.
Figure 4:
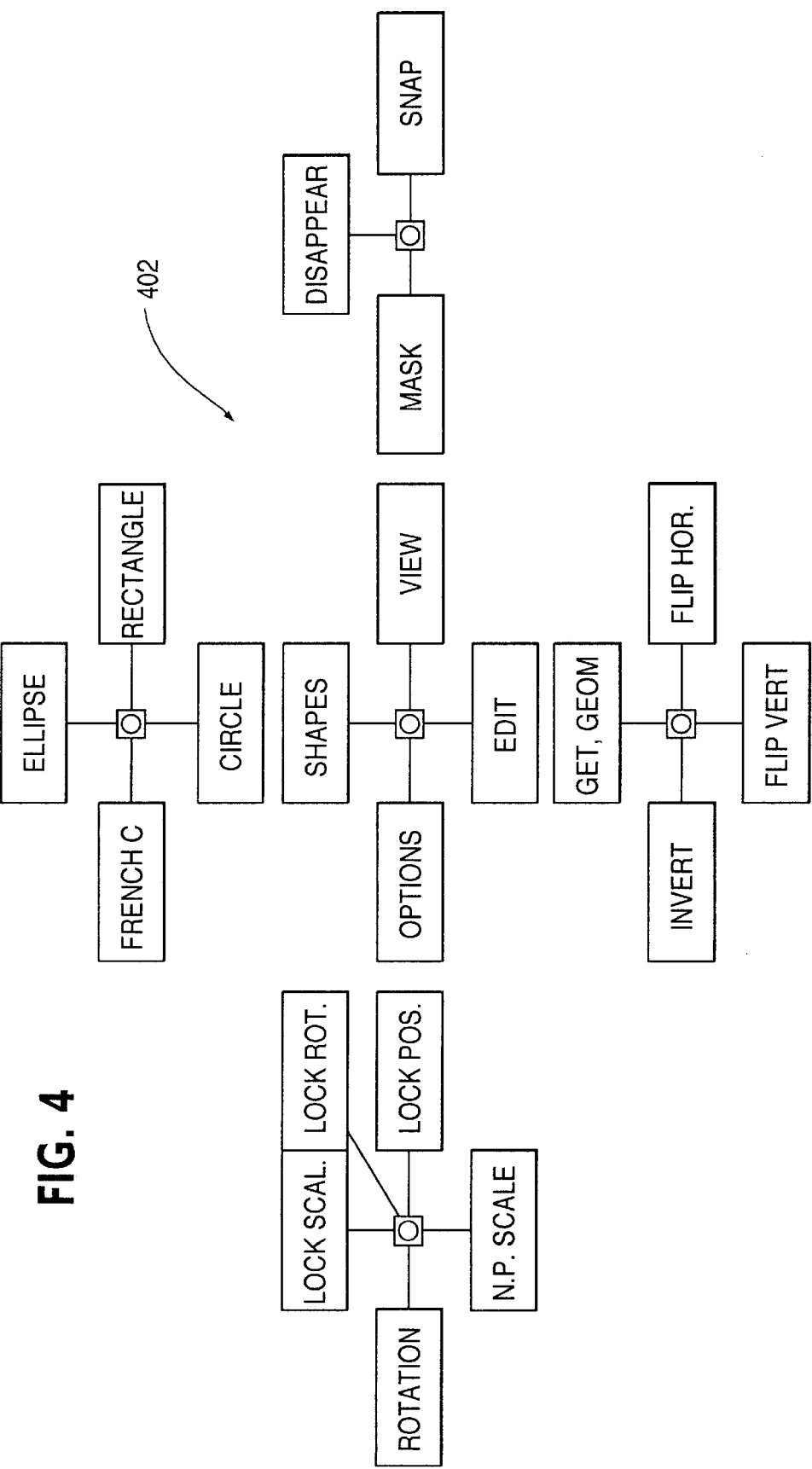
FIG. 4 illustrates a contextual marking menu.

When the design guides of the present invention are used in the conventional graphics user interface systems the design guides preferably have conventional control points, also informally called "handles", such as illustrated in FIG. 2. As shown in FIG. 2, the sweep design guide 202 as well as the french curve design guide 204 each preferably include a drag and drop icon 206 associated therewith that allows the design guide to be dragged and dropped at a desired position or at a desired storage location out of the drawing on a storage place on the screen called a "shelf". The guides are stored internally as a list of points corresponding to the outside edge of the guide like other geometric objects of drawing programs. When dropped, the guide becomes part of the drawing geometry, that is, it is applied to the drawing when dropped. The guides 202 and 204 also preferably include conventional rotate and resize handles 208 that a allow the guide to be rotated and resized. This is shown particularly in FIG. 3 where the french curve design guide 302 has been rotated and made a smaller size. The guides also preferably include conventional contextual menu hot spots 210 (see FIG. 2) that allow the user to call up or use a conventional contextual marking menu or pop-up menu 402, such as illustrated in FIG. 4. The guide is a drawing data object that is part of the drawing geometry, that is, there is no need to "apply" the object to the drawing to affect the drawing with the guide. Moving the design guide (a raster image) involves erasing it from the current location and then redrawing it at the new position. The paint applied by a tool such as a paint brush is also a drawing object stored in a raster image (a raster image is a bidimensional array of pixels, i.e. a matrix where each element describes a given color, the complete matrix can be viewed as a coherent image when each of its elements is displayed on the screen at their respective coordinates in the matrix).

Figure 5:
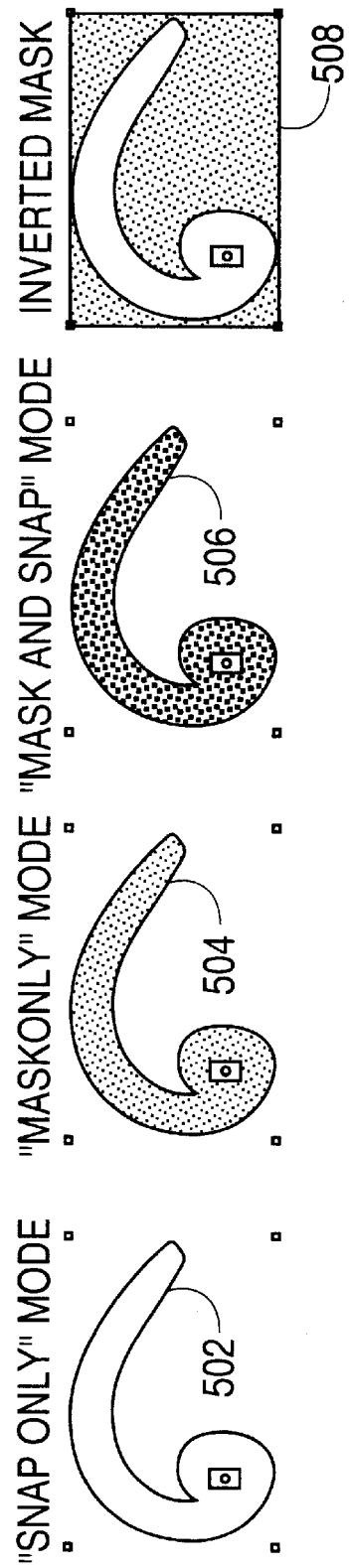
FIG. 5 illustrates guide modes.

The design guides are also preferably displayed with different outlines or surface patterns depending on the particular operation being performed or mode in which the system is operating, as illustrated in FIG. 5. This will allow the user to visually identify the context of the design guide tool. A snap only mode can have an outline type of pattern as shown for sweep guide 502. When the mode is the mask mode a translucent pattern can be set for the area as shown by guide 504. When both the snap and mask mode are operational a different pattern can be provide for the surface as shown by guide 506. When in an inverted version of the particular mode the guide 508 can be shown inverted.

Figure 6A:
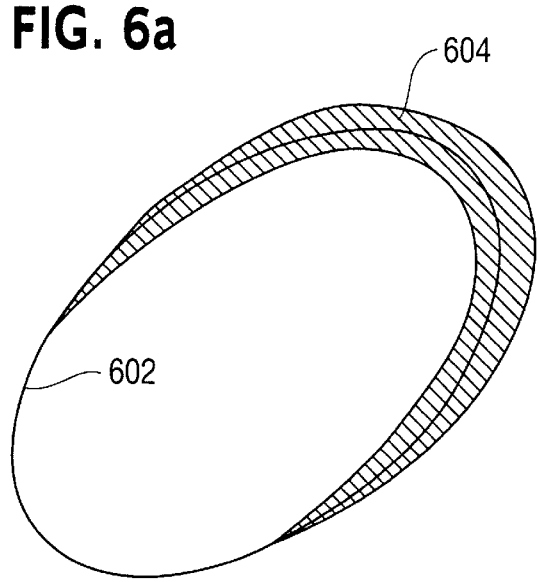
FIGS. 6a–6d depict effects produced by the present invention.
Figure 6B:
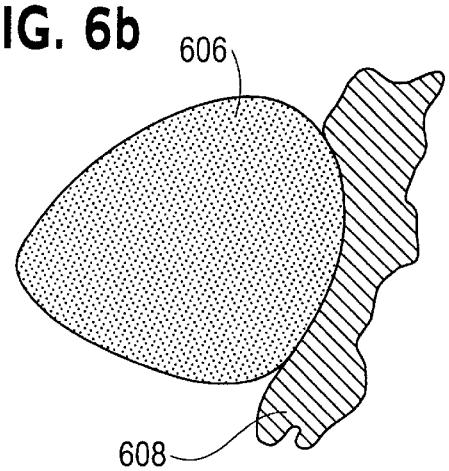
Figure 6C:
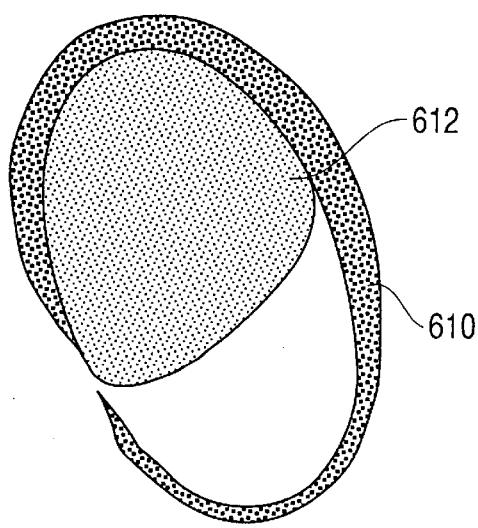
Figure 6D:
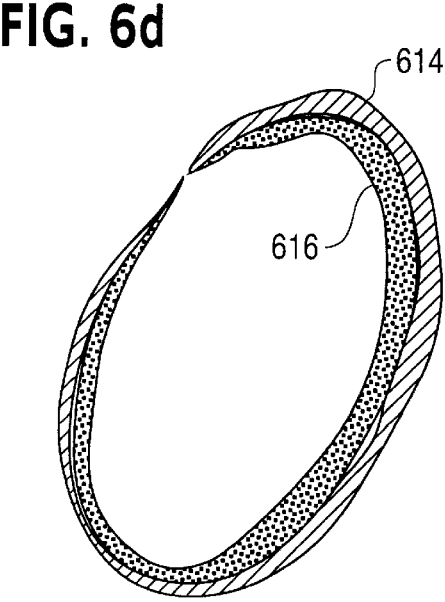

FIGS. 6a–6d depict several different effects that are achievable with the present invention. FIG. 6a depicts snap painting along a design guide 602 where the paint 604 follows the contour of the guide 602. FIG. 6b shows masking where the design guide 606 is used as a mask or frisket to restrict the paint 608 to the outside of the guide 606. The paint on the canvas is clipped by the shape of the guide. FIG. 6c illustrates snapping and masking where the paint 610 follows the contour of the guide (mask) 612 and is clipped by the shape of the mask (note a portion of the guide/mask 612 has been removed to show that the paint 610 is clipped to the contour of the guide 612. FIG. 6d depicts a snap and mask, and then inversion of the mask to paint with another color 616.

Figure 7:
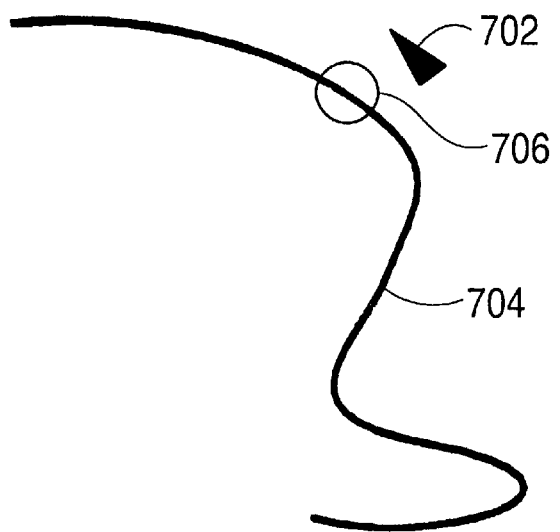
FIG. 7 depicts conventional snapping.
Figure 8:
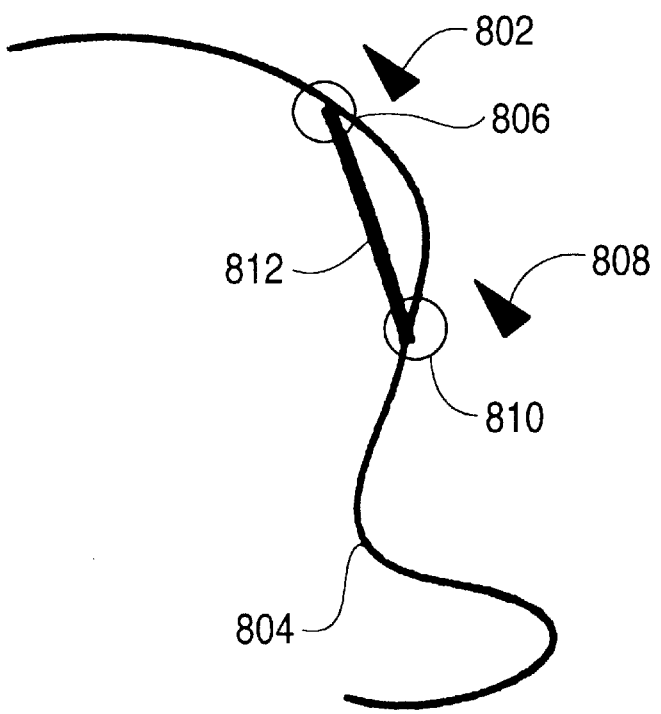
FIG. 8 depicts line drawing using conventional snapping.
Figure 9:
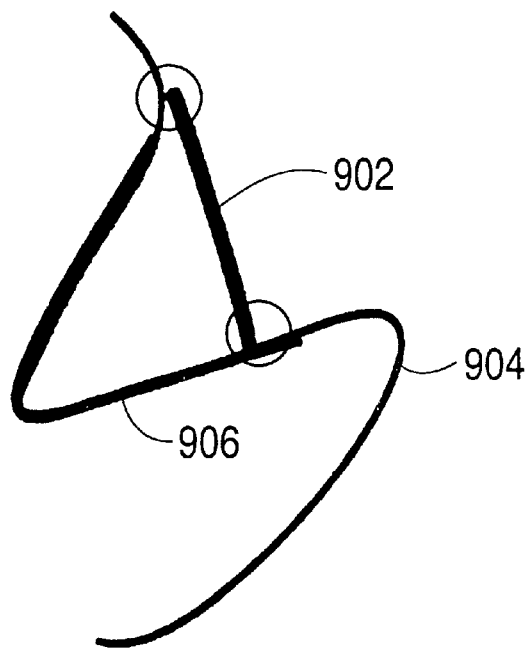
FIG. 9 depicts line drawing using conventional snapping.

As noted previously the present invention performs an operation called snap painting. A conventional snapping operation is one where a cursor is automatically moved to a particular point or object. When a cursor 702 is being conventionally snapped to a line 704 in a drawing, as illustrated in FIG. 7, the cursor 702 is moved to the closest point 706 on the line 704 to the current position of cursor 702. This snapping to the closest point can cause problems when trying to paint using such a conventional snapping algorithm. In such a painting operation where conventional snapping is used, as illustrated in FIG. 8, the user positions the cursor at a first position 802 close to the line 804 and the system snaps the cursor to the closest point 806. Next, the user moves the cursor to a second position 808 also close to the line 804 and the system snaps the cursor to the closet point 810 to this second cursor position. As the user moves the cursor the system draws a line directly or straight between the starting snap position and the current snap position of the cursor, resulting in a straight line 812 stroke being painted. Sometimes this operation is called snap dragging. This line simply joins the two snapped cursor positions (806 and 810) rather than following the smooth curvature of the line 804. The disastrous visible effects of this conventional approach to painting using a snapping algorithm are particularly shown in FIG. 9 where the painted line 902 produced by the system radically diverges from the line 904 used as a guide and from the desired path 906 of the brush. The problem becomes even worse when the guide line to be followed has a loop and a wrong portion of the loop is closer to the current position of the cursor than the correct portion which the user is attempting to follow. The conventional approach will snap to the wrong line in such a situation magnifying the error.

Figure 10:
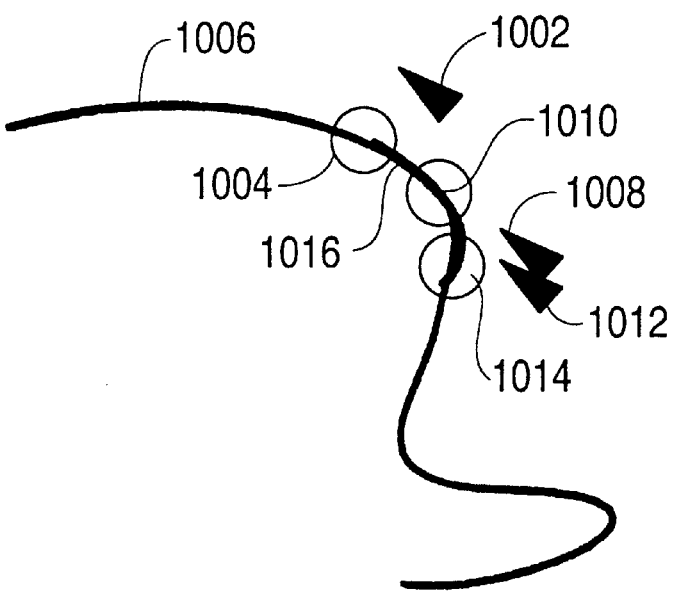
FIG. 10 illustrates guide line snapping according to the present invention.

The present invention instead of snapping to the closest position on the guide performs a different process. For each sample of the coordinates from the input devices, such as the stylus 118/tablet 116 and the mouse 112 (note both can be moved at the same time and the sampling rate is high enough in conventional devices of this type for the sampling to appear visually continuous on the screen, thus not introducing discontinuities in the drawing), the present invention determines the next line segment of the guide (either immediately previous or immediately succeeding) that is closest to the current position of the cursor and the system snaps to that segment. The actual closest point of the line is not always this closest segment of the guide. The matching is then as close as possible to the actual guide. This is shown in FIG. 10 where a first cursor position 1002 is snapped to the line segment 1004 of the guide 1006, the second cursor position 1008 is snapped to the segment 1010 and the third cursor position 1012 is snapped to the line segment 1014 thereby forming the painted line segment 1016. As noted above because the input devices generate move events at a resolution greater than the drawing the snapped positions remain close to the actual cursor position without ever jumping to an incorrect location.

Figure 11A:
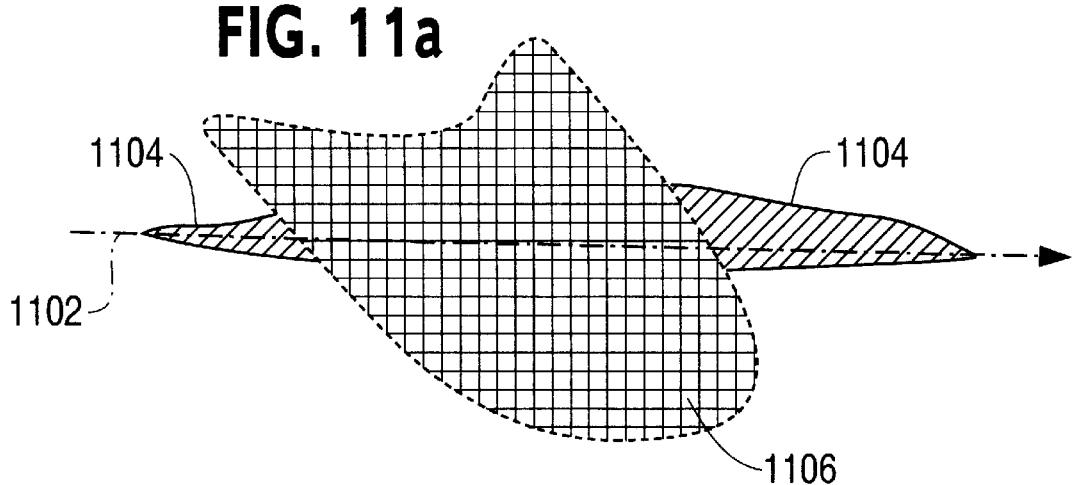
FIGS. 11a and 11b depict guide masking according to the present invention.
Figure 11B:

The masking operation of the present invention compares the position (coordinates) of the cursor of the brush (or if the brush is a "wide" brush with the extent of the brush around the cursor coordinates) with the area of the mask and turns on pixels in the drawing when the there is no coincidence and does not turn on pixels of the drawing when coincidence exists. This is shown in FIG. 11a where the coordinate path 1102 of the cursor (or trajectory of the pen) is shown by a dashed line, the paint 1104 by a hatched line and the and the mask 1106 by a crosshatched area. As can be seen from FIG. 11b which shows the result, the paint exists only outside the mask 1106 and along the path 1102 of the cursor.

Figure 12:
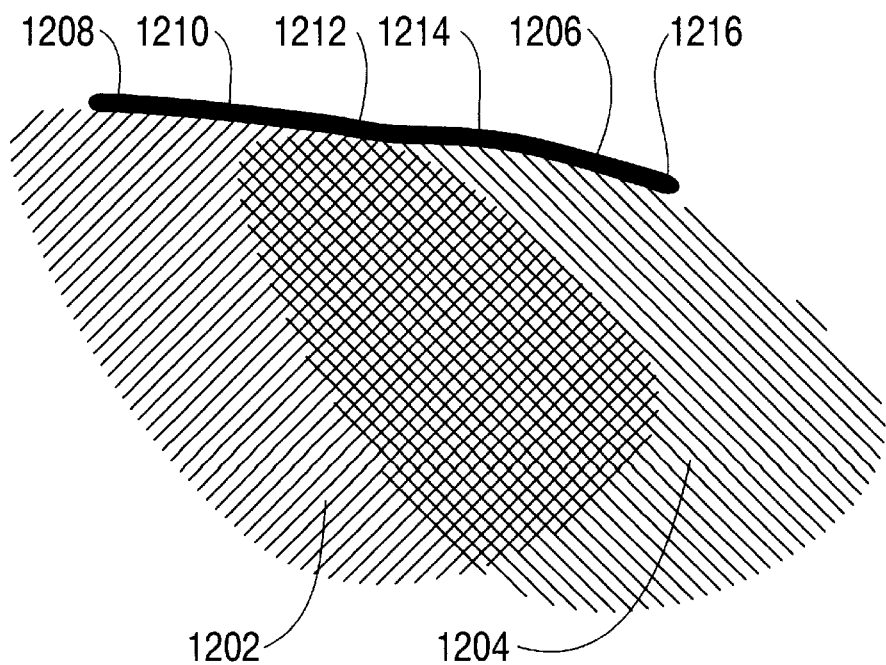
FIG. 12 depicts the result of guide movement while using the drawing tool.

As noted previously, the present invention allows the design guide to be moved simultaneously with the drawing tool. This is like the mechanical equivalent of moving a french curve while drawing with a pencil. This particularly allows the user freedom to change the shape being drawn interactively. This is shown in FIG. 12 where design guide has been placed in two different positions 1202 and 1204 while drawing a line 1206. As can be seen, the drawn line segments 1208, 1210, 1212 follow the guide when it is in the first position 1202 and the line segments 1214 and 1216 follow the guide when it is in the second position 1204. During the movement from the first position 1202 to the second position 1204, the drawing line segment 1218 starts at the first position 1202 of the guide and ends at the second position 1204 of the guide. This ability to move the guide and affect the range of action of the drawing tool also applies when the guide is being used for masking. For example, if the guide is used for masking on its left side as it is moved, the area 1120 shown by hatching and cross hatching would be masked.

The process performed in accordance with the present invention to perform simultaneous movement of the drawing tool and the drawing guide along with snapping and masking is preferably an interrupt based process implemented in a computer language such as $C^{++}$. The process 1300 is illustrated by block diagram of FIG. 13 and is described in detail by the pseudocode of the Appendix included herewith.

The first step 1302 is to conventionally select and place the desired guide in the desired location. Next, the most recent outputs from the input devices (such as 112 and 114 of FIG. 1) are obtained 1304 and that include position coordinates/indicators or motion indicators. The drawing guide is then moved 1306 (see procedure MOVE) to the position indicated by the input from the control device for the guide, such as the mouse 112, which can be controlled by the users non-dominant hand. Of course if the guide input device does not indicate any movement of the guide no movement is performed. In moving the guide the mask layer follows the current location of the drawing geometry to allow masking at the same time. When the drawing geometry is rotated (see procedure ROTATE SCALE), the mask layer is cleared and the geometry shape of the design guide is drawn again (see procedure REFRESH), hence, the mask (if being used) is always updated to match the exact contours of the geometry.

Next, the system determines 1308 whether the process is in the snap mode (see procedure SNAP). The snap mode can be set by the user using the marking menu of FIG. 4. When in the snap mode the system determines 1310 the next immediate line segment of the guide associated with the cursor as previously discussed. The cursor (which is being controlled by the dominant hand) is then moved 1312 to that line segment.

Once the processing for the snap mode is completed, the system determines 1314 whether it is in the mask mode (see procedure BRUSH STROKE). If so, the cursor position is compared 1316 to the mask (the area of the guide or the inverted area of the guide if the guide is inverted). If the cursor (or paint) is not within the mask the corresponding pixels of the drawing are painted 1318, that is, the pixels within the raster bit map are set with the appropriate color. The process then returns for another set of coordinate samples.

As noted above, when painting, a user settable option can make the brush or current tool "snap" to the geometry shape of the design guide within geometry layer. The geometry of the design guide can be applied to the mask layer of the paint program. The design guide within the geometry layer can be synchronized to be moved, rotatedand scaled simultaneously with the drawing. The design guide within the geometry layer can be dragged around and positioned with the non-dominant hand, making a two handed editing operation also possible. The design guide is drawn in the geometry layer of the overlay planes allowing representation of the design guides and masks as semitransparent and fast updates. The usual "handles" used to edit geometry objects are provided by a "contextual menu" hot spot that allows applying functions to the object. These handles are made to detect whether the user is using one or two hands to edit the shape and adapt in consequence.

The present invention also provides a geometric shape that is moved, rotated and scaled on the screen and stays there permanently, independently of any current tool. This shape can be drawn by the user or chosen from a set of default shapes that encompass the most frequently used rulers, sweeps, french curves, etc. The shape can be manipulated like a conventional geometric object (like in any 2D drawing program). Paint strokes can be snapped to the geometry when a brush is applied. The paint strokes can be optionally masked by the geometry. The invention provides the ability to edit the shape rapidly with a contextual marking menu by translating, rotating scaling, selecting and using predefined shapes, inverting, flipping horizontally/vertically and switching modes. The mask/guide can be controlled with the left hand while the right hand paints. The design guide can be put on the shelf via drag and drop operations for fast reuse.

The many features and advantages of the invention are apparent from the detailed specification and, thus, it is intended by the appended claims to cover all such features and advantages of the invention which fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

APPENDIX

The pseudo code below assumes the use of two pointers, referred as maine_pointer and second_pointer, that the user can manipulate in parallel. Each single state modification (movement) of an input device by the user results in a an "event" being sent by the system to the application program. Any code dealing with the second pointer is not necessary to the implementation of the invention, but describes the preferred embodiment, which uses two-handed input.

Variable names are in lower case, procedure names are in CAPITAL, type names are Capitalized. Phrases in between { } are comments, not instructions. A syntax close to that of the Pascal programming language, but slightly relaxed, is used.

Type Declarations
Boolean : [true or false] {a two state variable}
Point : record {a two field record holding x:abscissa and y:ordinate of a position}
   x: Real, y: Real
   end
Event: record
   type: (mainpointer.press, mainpointer.move, mainpointer.release, secondpointer.move . . . ),
   position: Point
   {other type specific information}
   end
Rectangle: record
   top: Real, left: Real, right: Real, bottom: Real
   end
Color: record
   red: Real, green: Real, blue: Real, transparency: Real
   end
Raster_Image: record {a two dimensional array of pixels (i.e. Colors) defining the data the user considers as the piece of work}
   width: integer
   height: integer
   pixels: array [width, height] of Color
end
{a raster image can be addressed as an array: image [x,y] returns the color at pixel x,y. It has two other fields: width and height, defining its boundaries. Note that windows are special kinds of raster images (they can be displayed on the screen) }
Polygon: record {a list of points defining a closed region}
   size: integer,
   points: array [size] of Point,
   firstpoint: Point {=array[0] } extremity: Point {=point in points that is the further away
    from firstpoint}
end Variable Declarations
Polygon sweep; {is a shape used as a design guide, a mask
    or both, this shape has been defined by the user, using
    conventional drawing tools and is shown on the canvas,
    like all other geometric objects, there can of course be
    many types of design guides, without any conceptual
    changes in the program.}
Boolean snapping; {is set via a menu: when true, the cursor
    coordinates must follow the guide lines instead of being
    at the exact cursor location} Boolean masking; {is set via
    a menu: when true, the sweep is used as a mask, i.e. the
    sweep interior (or exterior if the user asked for it) is used
    as a mask where paint cannot be applied.}
Event ev; {an event describing, as in most graphical system,
    a single elementary action done by the user at one point
    in time.}
Boolean painting_started;
Raster_Image mask; {region to be used as a mask when
    brushing on the canvas}
Raster_Image canvas; {depicts an image that the user is
    editing}
Raster_Image brush; {a smaller image depicting the shape
    of the brush the user wishes to use, the paint program
    typically allows the user to defines many possible shapes}
Point mask_offset; {a point defining the alignment between
    the mask and the canvas}
Rectangle rotate_handle; {a rectangle defining an active
    zone, where the user can click to rotate and scale the
    design guide using two hands, instead of painting}
Point last_point_snapped;

Procedures Implementation
MAIN_PROCEDURE
begin {. . . do various initializations, like the current brush,
    the current canvas and the current mask . . . }
Boolean brushing :=false
Boolean rotating :=false
Point snapped_position;
painting_started :=false
loop
    GET_EVENT (ev) {system provided routine}
    CASE ev.type IS
    second_pointer.move: MOVE (sweep, ev.position)
    main_pointer.move: begin
        if rotating then
            ROTATE_SCALE (sweep, ev.position, second_
                pointer.position)
        else begin
            if snapping then
                snapped_position:=SNAP (sweep,
ev.position)
            else snapped_position: ev.position
            if brushing then begin
                BRUSH STROKE (brush,previous_position,
                    snapped_position,
canvas,mask)
                painting_started :=false
            end
            MOVE_CURSOR (snapped_position)
            previous_position :=snapped_position
        end
    end
    main_pointer.button_press: begin
        if IN(ev.position, rotate_handle) then
rotating :=true
        else brushing :=true
        painting_started :=true
        previous_position :=ev.position
    end
    main-pointer.button_release: begin
        if rotating then begin
            REFRESH_MASK (sweep)
            rotating :=false
        end
        brushing :=false
    end
    {. . . handle here other events coming from the system and
        not related to the invention, like key strokes, tool
        operation, refresh events, etc . . . }
end loop
end
procedure BRUSH_STROKE (Raster_Image brush,
    Point from, Point to,
    Raster_Image on,
    Rater_Image mask)
(Note: this procedure is defined by the graphics system and
    most of the time implemented in hardware. Because the
    way it is used is central to the invention, it is detailed here,
    even though there is no need to reimplement it, as most
    common desk top computers have such a routine ready to
    be used by programmers)
begin
ERASE (rotate_handle, canvas) {erase the sweep from the
    canvas before applying actual paint}
ERASE (sweep, canvas)
for each point p1 on the line between from and to do
    for each point p2 in [0..brush.width],
[0 brush.height] do
        if brush [p2.x, p2.y] # fully_transparent_color
then
            begin {center the brush along the path}
                Point p3 :=[p1.x + p2.x-brush.width/2,
                p1.y+p2.y-brush.height/2]
                if (not masking) or (mask[pe.x-mak_offset.x,p3.y-
mask_offset.y} # white_color) then
                    canvas[p3.x, p3.y] := brush[p2.x, p2.yl]
                    {apply paint on p3}
            end for
    end for
end
DRAW (sweep,canvas,50%transparent) {show the sweep
    again}
DRAW (rotate_handle, canvas, 50%transparent)
end function SNAP (Polygon sweep, Point p)
begin
Point closest_point;
if painting_started then
    begin
        {this is the place is where snap-painting or snap-drawing
            differs essentially from snap-dragging: instead of using
            the closest point among all the points in the design
            guide, the search is only between the previous and the
            next point along the guide from the point that was
            previously snapped this is to ensure continuity of the
            painted stroke as a side effect, this is much more
            efficient than classical snap-dragging}

```
    closest_point := last_point_snapped;
    Point newpoint1 := Next point in the list after last_
       point_snapped;
    Point newpoint2 := Previous point in the list
before
    last_point_snapped;
    if DISTANCE(newpoint1, p) < DISTANCE (p, closest_
       point.) then
       closest_point := newpoint1;
    if DISTANCE(newpoint2, p) < DISTANCE (p, closest_
       point.) then
       closest_point :=newpoint2;
end else begin {regular snapping as it is usually performed}
    closest_point := sweep.firstpoint;
    for each point p2 in sweep do
       if DISTANCE(p2, p) < DISTANCE (p, closest_point)
          then
          closest_point :=
p2;
    end
end
last point snapped := closest_point;
return closest_point;
end
function DISTANCE (Point p1, Point p2)
begin {system provided routine returning square
root ((p1.x-p2.x)^2+(p1.y-p2.y)^2)}
end function ANGLE(Vector a, Vector b)
begin
return arc_cosine ((a.x*b.x + a.y*b.y)/square_root ((a.x-
   b.x)*(a.x-b.x) + (a.y-b.y)*(a.y-b.y)));
{returns the angle defined by the vectors a and b, namely
   their normalized scalar product (viewed as a cosine)}
end procedure ROTATE_SCALE (Polygon sweep, Point first,
    Point second)
begin
ERASE(full_size_of_sweep, canvas);
(this procedure fits the bounding box of sweep into the
   bounding box defined by [first point, second point]
   .sweep.extremity is the point on the sweep at the opposite
   side of the first point of the sweep. for instance, if sweep
   is the rectangle (ABCD), A is the first point and C is the
   extremity.
```

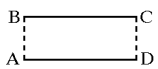

```
{
real scaling_factor = DISTANCE(first, second)/
    DISTANCE (sweep. firstpoint,
sweep.extremity);
real rotation_factor = ANGLE(Vector(first, second), Vector
    (Sweep.firstpoint,
sweep.extremity));
for each point p in sweep do
    scale p by scaling_factor
    rotate p by rotation_factor
end
{here, the rotate handle is moved to have it follow the sweep,
   in this example, the rotate handle is defined as a square of
   width 20 pixels on the top right corner of the sweep}
    rotate_handle.left := second.x − 10;
    rotate_handle.right := second.x +10;
    rotate_handle.top := second.y +10;
    rotate_handle.bottom := second.y −10;
    Draw (sweep, canvas, 50%transparent);
end procedure REFRESH_MASK (polygon sweep)
begin
ERASE(Rectangle(0,0,mask.width, mask.height), mask)
mask_offset.x := 0; mask_offset.y := 0
DRAW (sweep, mask, white_color)
end procedure MOVE (polygon sweep, point at)
begin {this procedure moves the sweep at a given
    point on top of the canvas}
ERASE(rotate_handle, canvas)
ERASE (sweep, canvas)
Vector v = [at.x-sweep.first_point.x, at.y−sweep.first_
    point.y]
for each point p of sweep do
    p.x += v.x; p.y += v.y
end
mask_offset.x += v.x;mask_offset.y += v.y
rotate_handle.left += v.x; rotate_handle.right += v.x
rotate_handle.top += v.y; rotate_handle.bottom += v.y
DRAW(sweep, canvas)
DRAW(rotate_handle, canvas)
end procedure MOVE_CURSOR (point at)
begin {this procedure is conventionally defined by the
    system and simply moves the coordinates of the pointer to
    the specified location}
end Boolean IN (Point p, Rectangle r)
begin {this routine tests if the given point p is inside the
    rectangle r}
end procedure ERASE (Polygon, Raster_Image)
begin {conventionally a system provided routine that erases
    the pixels inside of polygon from the provided raster
    image (or window)}
end procedure DRAW (Polygon, Raster_Image, Color)
begin {a conventionally system provided routine that puts
    the pixels located inside the polygon on the raster image
    to the specified color}
end
```

What is claimed is:

1. A computer system having a program displaying a hand movable marking guide, allowing a user to interact with the guide using a displayed and independently hand movable marking tool, on a same graphics level as the guide preventing an application of marks to an object using the guide and controlling a range of action of the tool with the guide as the guide and/or tool are moved and marks are made.

2. A system as recited in claim 1, wherein movement of the guide affects the range of action of the tool.

3. A system as recited in claim 1, wherein the guide automatically controls where the application of paint to a drawing occurs.

4. A system as recited in claim 3, wherein the guide can be moved during the application of paint to the drawing while the guide controls the application of paint and controls a range of action of the tool.

5. A computer system having a program displaying a hand movable marking guide and allowing a user to interact with an edge of the guide using a displayed and independently, hand movable marking tool on a same graphics level as the guide by snapping lines drawn by the tool to the guide controlling a range of action of the tool as the guide and/or tool are moved and marks are made.

6. A computer system having a program displaying a hand movable marking guide and allowing a user to interact an edge of with the guide using a displayed and independently, hand movable marking tool on a same graphics level as the guide by masking lines drawn by the tool with the guide preventing an application of paint to a drawing using the guide as the guide and/or tool are moved and marks are made.

7. A computer system having a program displaying a hand movable marking guide and allowing a user to interact with an edge of the guide using a displayed and independently, hand movable marking tool on a same graphics level as the guide by snapping lines drawn by the tool to the guide controlling a range of action of the tool with the guide and masking lines drawn by the tool with the guide preventing an application of paint to a drawing using the guide as the guide and/or tool are moved and marks are made.

8. An apparatus, comprising:

a display;

first and second input devices providing motion indicators; and a computer coupled to said display and said input devices, displaying a marking guide and a marking tool with the guide and the tool being on a same graphics level, receiving the motion indicators, controlling positions of the guide and the tool responsive thereto, limiting an application of marks to an object using an edge of the guide and controlling a range of action of the tool with the edge of guide.

9. An apparatus as recited in claim 8, wherein the tool draws a line which is made to conform to the guide.

10. An apparatus as recited in claim 8, wherein movement of the guide affects an action of the tool.

11. An apparatus as recited in claim 8, wherein the guide is rotatable and scalable.

12. An apparatus, comprising:

a display;

first and second input devices providing motion indicators; and a computer coupled to said display and said input devices, displaying a marking guide and a marking tool with the guide and the tool being on a same graphics level, receiving the motion indicators and controlling positions of the guide and the tool responsive thereto and said computer comparing a moved position of a cursor of the tool to a next immediate line segment of the guide and moving the cursor to the line segment.

13. An apparatus as recited in 12, wherein the tool draws a line which is masked by the guide.

14. An apparatus as recited in claim 13, wherein said computer compares a path of the tool to the design guide and draws the line responsive to the comparison.

15. An apparatus, comprising:

a display;

first and second input devices providing position indicators; and a computer coupled to said display and said input devices, displaying a marking guide and a marking tool with the guide and the tool being on a same graphics level, receiving the position indicators and controlling the positions of the guide and the tool responsive thereto to mark a line which is made to conform to the guide by comparing a moved position of a cursor of the tool to a next immediate line segment of the guide, moving the cursor to the line segment, performing line masking by the guide by comparing a path of the tool to the guide, marking the line responsive to the comparison.

16. A process, comprising:

displaying a marking guide; and allowing a user to interact with the guide through a displayed tool by snapping marks made by the tool to the guide controlling a range of action of the tool with the tool and the guide being on a same graphics level as the tool.

17. A process, comprising displaying a marking guide; and allowing a user to interact with the guide through a displayed tool by masking marks drawn by the tool with the guide limiting an application of marks to an object using the guide and the guide being on a same graphics level as the tool.

18. A process, comprising:

allowing a user to select and place a design guide on an electronic drawing;

sampling position indications from first and second input devices;

moving the guide responsive to the indications from the first of the input devices;

determining a next immediate line segment of the guide responsive to the indications from the second of the input devices and moving a cursor at a same graphics level as the guide to the line segment; and determining whether a drawing mark produced by the cursor is masked by the guide and masking the mark responsive to the determination.

19. A storage media storing a process displaying a marking design guide, allowing a user to interact with the guide through a displayed tool limiting an application of a mark to a an object using the guide and controlling a range of action of the tool with the guide and the guide being on a same graphics level as the tool.

20. A computer system having a program displaying a drawing guide defined as a drawing data object and a drawing tool producing drawing data with the guide and tool being on a same graphics level, allowing a user to simultaneously move the guide and the tool limiting an application of paint to a drawing using the guide and controlling a range of action of the tool with the guide.

21. A computer system having a program displaying a marking guide and allowing a user to interact with the guide through a displayed marking tool located on a same graphics level as the guide.

22. A computer system having a program displaying a marking guide and allowing a user to interact with the guide through a displayed marking tool using one hand for the guide and one hand for the tool with the tool and the guide being on a same graphics level.

23. A process, comprising:

displaying a marking guide; and allowing a user to interact with the guide through a displayed tool by moving the tool with one hand and the guide with another hand with the guide being on a same graphics level as the tool.

24. A computer system having a program displaying a marking guide in a same graphics level as a displayed marking tool, and allowing a user to interact with both inside and outside edges of the guide using the displayed marking tool with the guide preventing an application of marks to an object as the tool and/or guide are moved and marks are made.

25. A computer system having a program displaying a hand movable marking guide, allowing a user to interact with an edge of the guide using a displayed and independently hand movable marking tool on a same graphic level as the guide, constraining an application of marks to an object using the guide and controlling a range of action of the tool with the guide as the guide and/or tool are moved simultaneously with marks being made.

26. A computer system having a program displaying a hand movable marking guide, allowing a user to interact with an edge of the guide using a displayed and independently hand movable marking tool on a same graphics level as the guide, constraining an application of marks to an object using the guide and controlling a range of action of the tool with the guide as the guide and tool are moved simultaneously with marks being made.

27. A computer system having a program displaying a hand movable marking guide, allowing a user to interact with the guide using a displayed and independently hand movable marking tool, on a same graphics level as the guide preventing an application of marks to an object using the guide and controlling an effective motion of and a range of action of the tool both inside and outside the guide with the guide as the guide and/or tool are moved and marks are made.

* * * * *

UNITED STATES PATENT AND TRADEMARK OFFICE
CERTIFICATE OF CORRECTION

PATENT NO.     : 6,377,240 B1
DATED          : April 23, 2002
INVENTOR(S)    : Thomas Baudel et al.

It is certified that error appears in the above-identified patent and that said Letters Patent is hereby corrected as shown below:

<u>Title page,</u>
Item [75], Inventors, delete "Liepe" and insert -- Liepa --

Signed and Sealed this

Third Day of December, 2002

JAMES E. ROGAN
*Director of the United States Patent and Trademark Office*